(12) United States Patent
Wolkoff et al.

(10) Patent No.: US 8,082,178 B2
(45) Date of Patent: Dec. 20, 2011

(54) SYSTEM AND METHOD FOR MANAGING ADVERTISING CAMPAIGN DATA

(75) Inventors: Steven Wolkoff, San Francisco, CA (US); Vladislav Sinaniyev, Flushing, NY (US); Dritan Suljoti, Astoria, NY (US); Gary Steven Grossman, San Francisco, CA (US); Gilles Drieu, San Francisco, CA (US); Suzanne Mattis Johnson, Brooklyn, NY (US)

(73) Assignee: Google Inc., Mountain View, CA (US)

( * ) Notice: Subject to any disclaimer, the term of this patent is extended or adjusted under 35 U.S.C. 154(b) by 1101 days.

(21) Appl. No.: 10/891,517

(22) Filed: Jul. 15, 2004

(65) Prior Publication Data

US 2006/0015355 A1 Jan. 19, 2006

(51) Int. Cl.
*G06Q 30/00* (2006.01)
*G05B 19/418* (2006.01)

(52) U.S. Cl. ........................ 705/14.72; 715/971; 707/608

(58) Field of Classification Search ............... 705/14, 705/14.72; 715/971; 707/608
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A | 9/1999 | Merriman | |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,985,882 B1 | 1/2006 | Del Sesto | |
| 7,039,599 B2 | 5/2006 | Merriman | |
| 7,136,875 B2 | 11/2006 | Anderson et al. | |
| 2002/0063714 A1* | 5/2002 | Haas et al. | 345/473 |
| 2002/0103698 A1* | 8/2002 | Cantrell | 705/14 |
| 2002/0128908 A1* | 9/2002 | Levin et al. | 705/14 |
| 2002/0129034 A1* | 9/2002 | Woehl | 707/103 R |
| 2005/0034121 A1* | 2/2005 | Fisher et al. | 717/175 |

FOREIGN PATENT DOCUMENTS

WO    WO 97/21183    6/1997

OTHER PUBLICATIONS

Building speed.(building interactive television content). Webdale, Jonathan. Mar. 13, 2003.*
Doubleclick and Macromedia launch new rich media product, DART Motif; Solution allows advertisers & publishers to streamline rich media advertising process and centralised reporting. M2 Presswire, NA, Nov. 4, 2003.*
AdForce, Inc., A Complete Guide to AdForce, Version 2.6, 1998.

(Continued)

*Primary Examiner* — John G. Weiss
*Assistant Examiner* — Victoria Vanderhorst
(74) *Attorney, Agent, or Firm* — Fish & Richardson P.C.

(57) ABSTRACT

A method and system for managing ad campaign data. According to one embodiment, an application receives a request to store data associated with an ad campaign, and responsive to the request, stores one or more output files and context information associated with the data, the context information assembled according to a pre-defined data format defining a role of the data within the ad campaign.

23 Claims, 7 Drawing Sheets

OTHER PUBLICATIONS

95/001,073, Reexamination of Stone et al., filed Sep. 30, 2004.
95/001,061, Reexamination of Stone et al., filed Sep. 3, 2002.
95/001,069, Reexamination of Dean et al., filed Jul. 11, 2002.
95/001,068, Reexamination of Stone et al., filed Dec. 7, 2002.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www. Archive.org, Apr. 12, 1997 and Feb. 1, 1997.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Information Access Technologies, Inc., Aaddzz brochure, "The Best Way To Buy and Sell Web Advertising Space," ® 1997.
Information Access Technologies, Inc., Aaddzz.com website archive from www.Archive.org, archived on Jan. 30, 1998.
Zeff, R. et al., Advertising on the Internet, 2nd Ed., John Wiley & Sons, 1999.
Dedrick, R., Interactive Electronic Advertising, IEEE, 1994.
Dedrick, R., A Consumption Model for Targeted Electronic Advertising, Intel Architecture Labs, IEEE, 1995.
Request for Reexamination of U.S. Patent No. 7,240,025 B2, Control No. 95/001,073.
Request for Reexamination of U.S. Patent No. 6,446,045 Bl, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.
Requestor's Comments Subsequent to Patent Owner's Response Under 37 C.F.R. § 1.947, Control No. 95/001,073.
Requestor's Comments Subsequent to Patent Owner's Response Under 37 C.F.R. § 1.947, Control No. 95/001,061.
Requestor's Comments Subsequent to Patent Owner's Response Under 37 C.F.R. § 1.947, Control No. 95/001,069.

* cited by examiner

SYSTEM AND METHOD FOR MANAGING ADVERTISING CAMPAIGN DATA

BACKGROUND OF THE INVENTION

One of the major problems in online advertising is that it takes a long time for a campaign to go live. Two of the main factors driving this problem are: involvement of many people and stakeholders, and complex creatives. A creative refers to the content of an advertisement which is displayed on a web site.

The first main factor is illustrated in FIG. 1. A typical campaign process is as follows: an advertiser (advertiser 115) comes up with a campaign, campaign goals, and campaign budget to promote a product or service. The advertiser works with an agency (agency 105) to arrive at a media plan which includes media buys (i.e., ad buys) across a series of publishers (e.g., publisher 100). The agency then negotiates these buys with the various publishers and sends orders to them once negotiations are completed.

During this process the agency sends campaign goals, target market information and creative specifications to a creative agency/designer (designer 110) to come up with a creative strategy and story boards (step 120). Once created (step 125), the designer sends the creative strategy and story boards back to the agency to assess whether the creative strategy matches the campaign goals (step 130). If not, the agency sends feedback to the designer (step 135), who revises the strategy and story boards (step 140) and sends them back for further review. If so, the agency forwards the creative strategy and story boards to the advertiser to assess whether the strategy matches the goals and company image (step 145). If not, the advertiser returns the strategy and boards to the agency with comments (step 150), at which point the agency forwards the feedback to the designer (step 135) for revised strategy and story boards (step 140). If so, the advertiser approves the creative strategy and story boards (step 155).

Upon the advertiser's approval, the agency gives approval for the design of the creatives to the designer (step 160), who then generates the creatives (step 165). The designer sends the generated creatives to the agency, who sends them on to one or more publishers (step 170). The publisher checks to make sure the creatives are within the proper specifications (step 175), and if they are, the publisher books and delivers the creatives on its ad serving system (step 180). If not, the publisher sends the creatives with feedback to the agency (step 185), who forwards the feedback to the designer (step 190). The designer redesigns the creatives (step 195) and forwards them back to the agency, who sends them back to the publisher (step 170).

As illustrated by this process, multiple parties are involved and several pieces of information are exchanged between them. This creates room for error and a complex network of communication among involved groups.

The second main factor driving the increasing length of time for a campaign to go live is the creative complexity. Some creatives are relatively simple and composed of one asset file, such as a graphic file; however, advertisers have recently been using more and more interactive ads called "rich media" ads. Rich media ads differ depending on the technology they use, but are similar in that they are all composed of several asset files. The most common rich media ads are Flash creatives, which are composed of HTML files which display the creative, main SWF files which contains most of the creatives, other child SWF files that contain different parts of the creative, image files which serve as back up content or are called by the different SWF files, and other auxiliary files like audio, video, XML, or text files. A rich media creative can be composed of 2-20 or more different files, which need to be placed and referenced correctly on an ad serving system. Sometimes the creative code needs information which the designer does not have but the agency has—in other cases the publisher has the required information.

Accordingly, there is a need in the art for a system and method for managing the data associated with advertising campaigns in a simple and efficient manner.

SUMMARY OF THE INVENTION

Embodiments of the present invention provide for managing ad campaign data. According to one embodiment, an application receives a request to store data associated with an ad campaign, and responsive to the request, stores one or more output files and context information associated with the data, the context information assembled according to a predefined data format defining a role of the data within the ad campaign.

DETAILED DESCRIPTION

Figure 1:
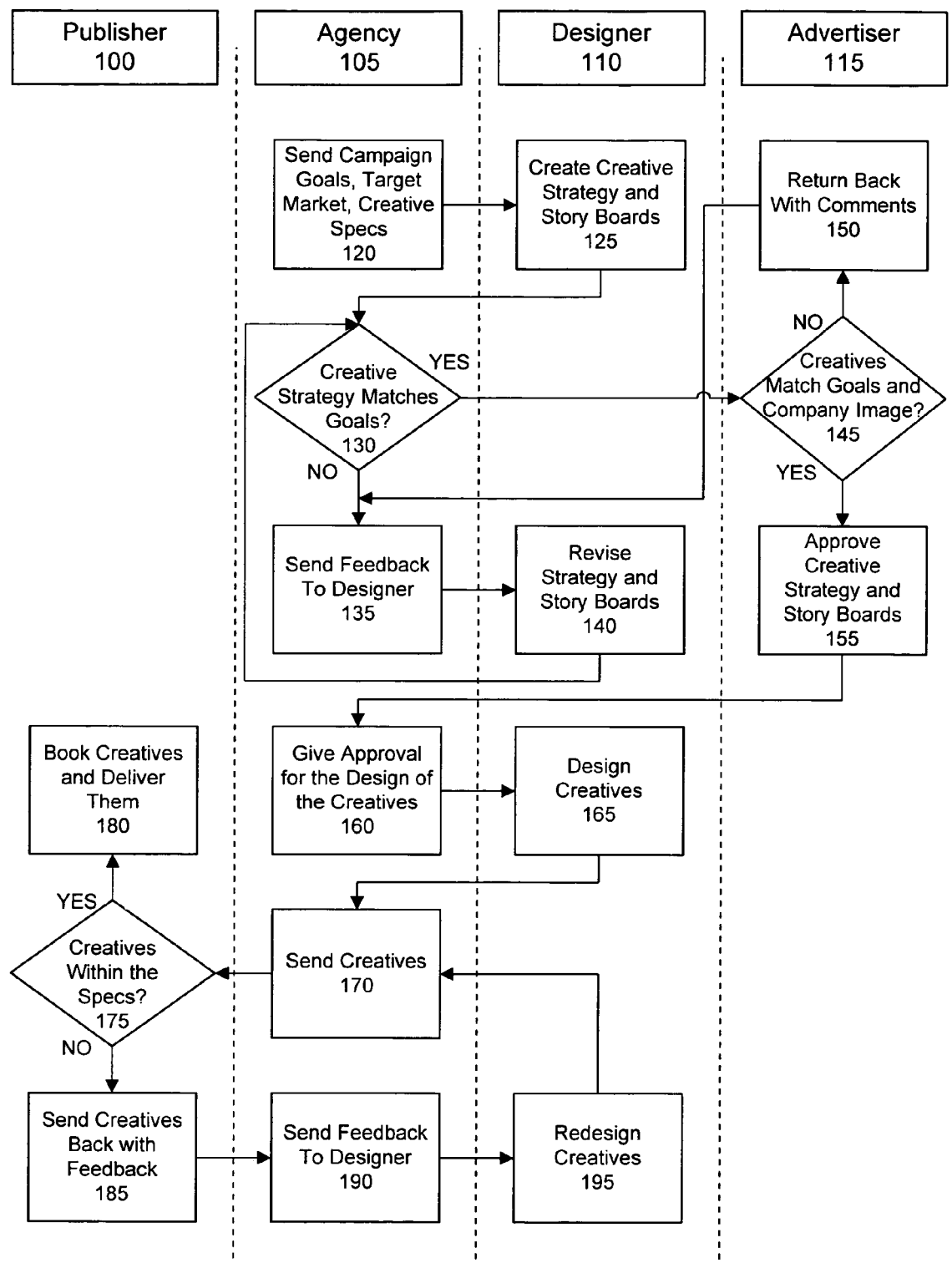
FIG. 1 is a flowchart that depicts a creative process behind creative design and booking.
Figure 2:
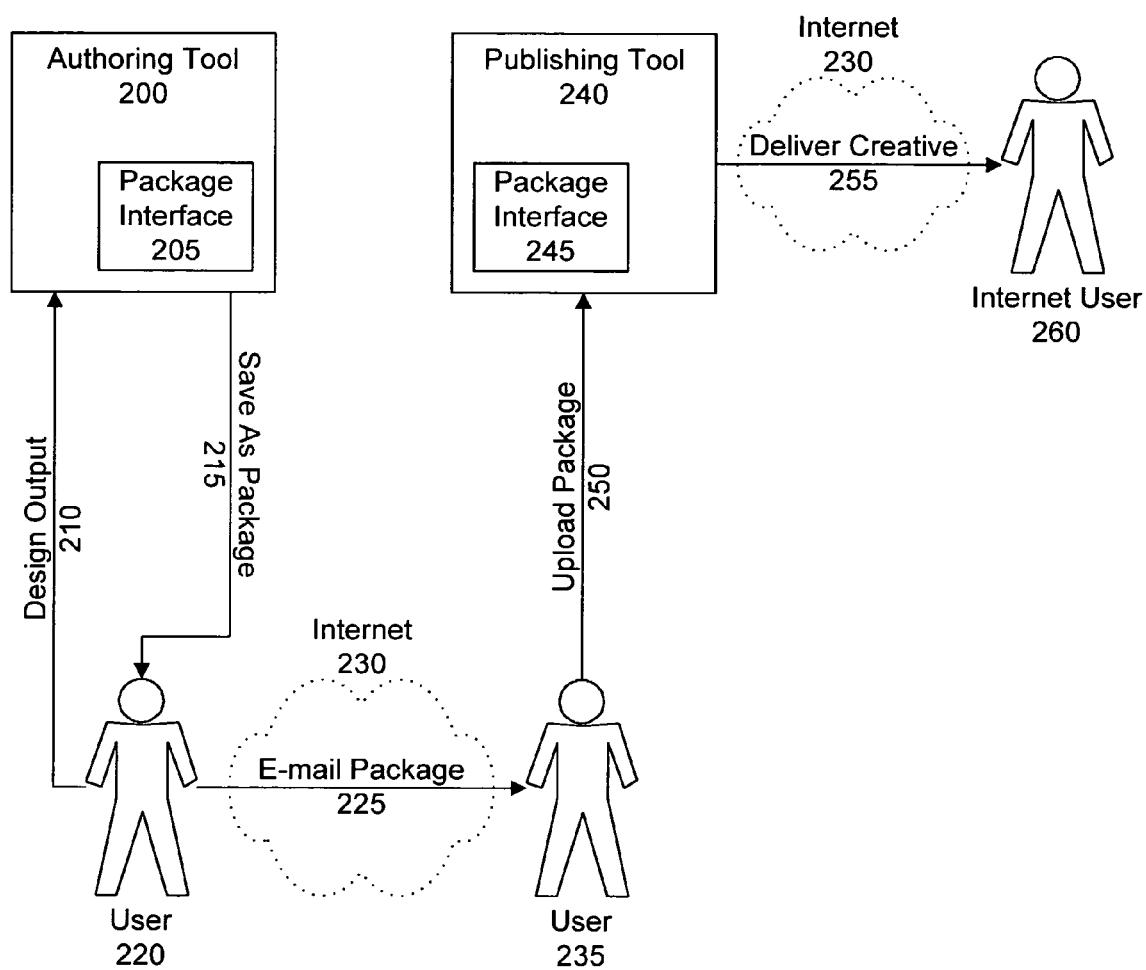
FIG. 2 is a block diagram that depicts a process for managing ad campaign data in accordance with an embodiment of the present invention.

FIG. 2 depicts a process for managing ad campaign data in accordance with an embodiment of the present invention. As explained above, the process of implementing an ad campaign can involve different parties in different locations, such as publisher 100, agency 105, designer 110 and advertiser 115. In FIG. 2, user 220 uses authoring tool 200 to design some form of output (step 210) to be utilized within the ad campaign.

For example, user 220 could be an agency creating a media plan (i.e., output) using a word processing application such as Microsoft Word (i.e., authoring tool 200). In another embodiment user 220 could be a creative designer generating a creative strategy (i.e., output) using a word processing application (i.e., authoring tool 200), or the designer could be producing a creative (i.e., output) using a corresponding software application such as Macromedia Flash (i.e., authoring tool 200).

Irrespective of the particular use of authoring tool 200, instead of authoring tool 200 simply producing corresponding output files (such as a Microsoft Word DOC or RTF file, or the various output files associated with Flash creatives discussed above), authoring tool 200 provides user 220 with the ability to save the output as a package that relieves user 220 of the need to alter, supplement, organize, or otherwise manage the output in its transition to the next user or role in the ad campaign process.

Figure 3:
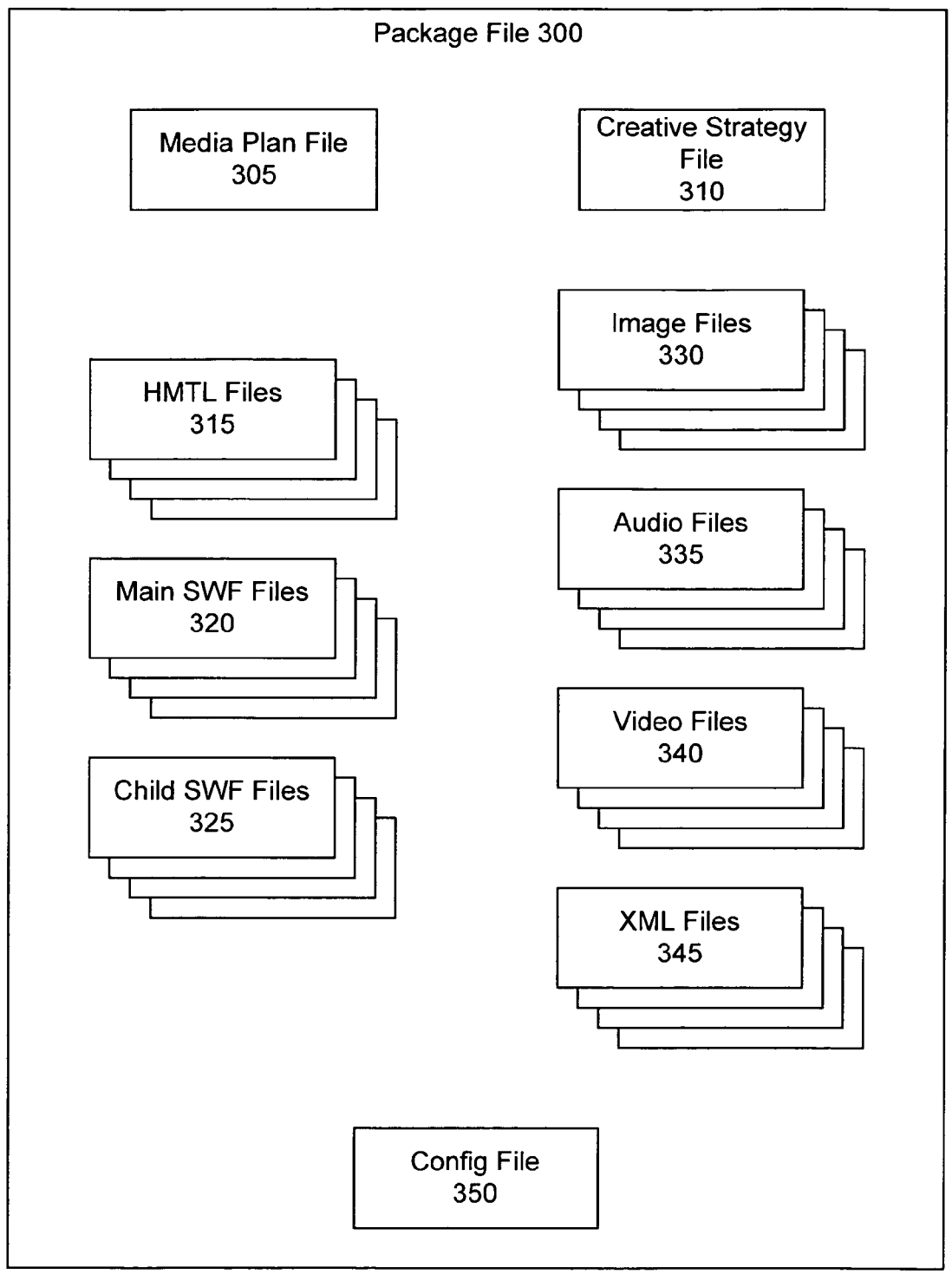
FIG. 3 is a block diagram that depicts a package file in accordance with an embodiment of the present invention.

An embodiment of such a package is illustrated in FIG. 3 as package file 300. Package file 300 includes the various output files generated within the ad campaign process along with a configuration file (config file 350), which stores information that provides a context of the output file data with respect to the corresponding ad campaign. The various output files in package file 300 include media plan file 305, creative strategy file 310 and some Flash creative files (e.g., HTML files 315, main SWF files 320, child SWF files 325, image files 330, audio files 335, video files 340 and XML files 345).

Presume, for instance, that user 220 is a designer who saves a newly generated rich media creative as a package according to the present invention. With the benefit of having the data associated with an ad campaign packaged in this manner, user 220 next merely e-mails the package file (step 225) over the Internet (230) to user 235 (e.g., an agency trafficker or publisher), who simply uploads the package file (step 250) into publishing tool 240 (e.g., an ad serving system) for automatic booking and delivery (step 255) to Internet user 260 over the Internet (230).

Without the benefit of the present invention, user 220 would have manually written up the implementing code for displaying the ad, or reused previously designed code and modified it to make the creative displayable. Once the code was written, user 220 would have sent the code and the asset for the creative to user 235, who then would have tested the creative, and could have modified it or used its own code to display the creative. The main reasons behind modifying the code for the creative are that different publishers have different specifications as to how the creative should be displayed and behave, and that there are many different ways of coding creatives, and certain companies have their preferred way of coding creatives because they do not want to spend too much time testing the creatives. Additionally, user 235 would have manually booked the creative, first by inputting the relevant campaign information into publishing tool 240 (e.g., campaign start time, end time, etc.) and uploading, organizing and arranging the creative output files into publishing tool 240.

By packaging the data associated with an ad campaign according to the present invention, software tools used in the ad campaign process can utilize additional functionality (embodied by package interfaces 205 and 245) to fully automate the processing of the packaged output files based on the information in the packaged configuration file. Thus, the present invention provides a simple method of transporting data associated with ad campaigns between users that are in different locations and using different applications. According to one embodiment, package interfaces 205 and 245 allow users to easily package and import (i.e., upload) multiple pieces of information in one file, versus having to deal with multiple files and figuring out where and how each file should be used.

Figure 4:
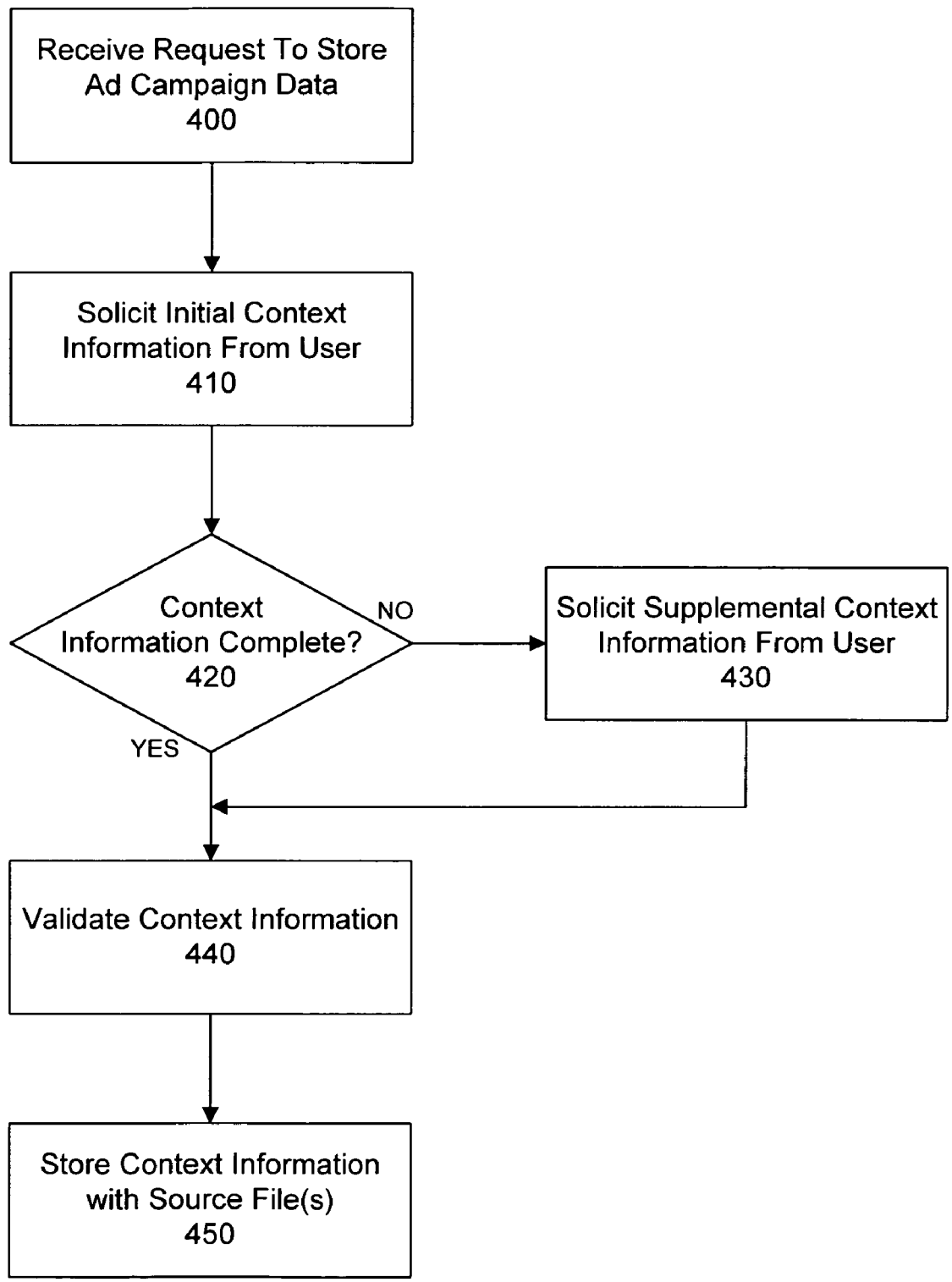
FIG. 4 is a flowchart that depicts a packaging process in accordance with an embodiment of the present invention.

FIG. 4 illustrates an exemplary packaging process implemented by package interface 205 in accordance with an embodiment of the present invention. After a designer (user 220) utilizes authoring tool 200 to create artwork (e.g., a creative), the designer selects a "Save As" or "Publish option" in order to save the work. Upon receiving this request to store ad campaign data (step 400), package interface 205 displays a modal window asking the designer for the following context information (step 410):

Campaign Info
Creative Type
Creative Name
Description
Width
Height

Once the designer fills out the information and selects "banner" as the creative type, package interface 205 looks at internal settings of authoring tool 200 (e.g., config file, registry or code instructions) to find out what other fields the designer should fill out (step 420). Because banner type creatives require supplemental context information, package interface 205 next displays two new fields for input (step 430):

Alt Text
Exit Link

The "Alt Text" field relates to an alternative text message to be displayed by a web browser in the event that the banner ad does not render. The "Exit Link" field relates to a click-through URL address to be followed in the event the banner is clicked.

Once the designer has filled out these fields and clicks "Publish", package interface 205 validates the information (step 440), and if the information is valid, creates a special file (i.e., a package file) containing:

Config File: includes all the settings for the creative which were input by the user or were associated with the artwork Artwork: the actual file the designer created (e.g., creative output files)

An example of a config file follows:

```
<?xml version="1.0" encoding="UTF-8"?>
<!DOCTYPE DTDReference SYSTEM "DTDReference.dtd">
    <CampaignInfo>
        <CampaignName>Fall Campaign</CampaignName>
        <StartTime>1 November 2003</StartTime>
        <EndTime>1 November 2004</EndTime>
    </CampaignInfo>
    <Creatives>
        <CreativeInfo id="Creative1">
            <FileName>banner.gif</FileName>
            <Type>Banner</Type>
            <Width>468</Width>
            <Height>60</Height>
            <AltText>Click Here</AltText>
            <ExitLink>http://www.site.com</ExitLink>
        </CreativeInfo>
    </Creatives>
</xml>
```

As illustrated in this embodiment, the config file is an XML document in which the context information is assembled according to a pre-defined data format based on an XML schema. The data format defines the role of the output data within the ad campaign, so that package interfaces 205 and 245 can rely upon the information in the config file to automatically process the corresponding output files within their respective application tools. In other embodiments the config file may include other ad campaign data like ad buys or order information.

According to an exemplary embodiment, the package file may be compressed using one of the different compression technologies available (e.g., zip, gzip, rar, etc.) and can be encrypted for security purposes. Different applications can be built so they can create, view, modify such package files. For example, a user can open a creative designing tool such as Flash, create the ad in that tool, package it using the technology mentioned above, and pass to another user that can actually upload the package in an ad serving system which in turn opens the package and processes it as necessary to correctly deliver the creative.

In another embodiment the packaged data may be included in more than one file. In yet another embodiment, the information associated with the config file may be placed in an e-mail with the corresponding output files as attachments. In yet another embodiment, the information associated with the config file may be incorporated into one or more of the corresponding output files.

Figure 5:
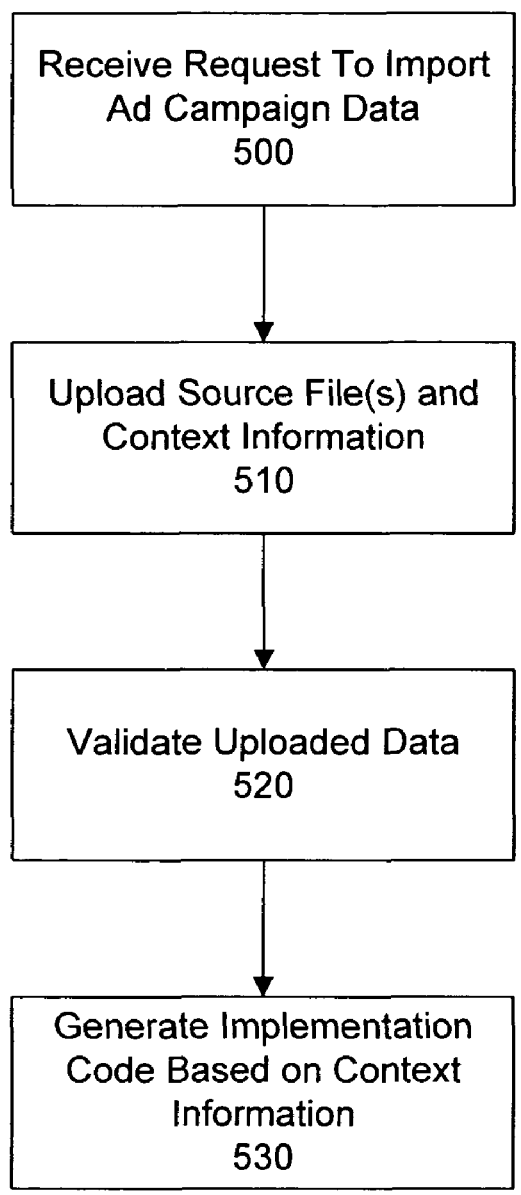
FIG. 5 is a flowchart that depicts a importing process in accordance with an embodiment of the present invention.

FIG. 5 illustrates an exemplary importing process implemented by package interface 245 based on the above config and creative output files in accordance with an embodiment of the present invention. Once the ad serving system (publishing tool 240) receives a request to import the artwork (step 500) by an agency (user 235), package interface 245 uploads the config and creative output files (step 510) and validates the package (step 520). Package interface 245 then stores internally the package and the individual files the package contains, and uses the information passed in the config file and information stored in a global template file to build the final code needed to display the creative to a viewer in a web browser (step 530). The global template file stores all the necessary business logic that is required to create the necessary output for the ad creative.

An example of a global template file follows:

```
<?xml version="1.0" encoding="UTF-8"?>
<!DOCTYPE DTDReference SYSTEM "DTDReference.dtd">
    <BannerCreative>
        <![CDATA[
        <!-- business logic -->
        ]]>
    </BannerCreative>
    <OtherCreative>
        <![CDATA[
        <!-- business logic -->
        ]]>
    </OtherCreative>
</xml>
```

In this embodiment package interface 245 checks the creative type in the config file for each creative, and based on the type creates the code necessary to display each creative based on the business logic specified for that type in the global template. Thus, if the creative is of the type "Banner" it would be deployed using the business logic generated and stored in the "BannerCreative" node of the global template.

Additionally, through package interface 245 the agency may view the settings of the creative on the ad serving system's application UI and edit any of the settings or information that came with the package. The settings can be changed at any time and the ad serving system can easily modify the config file and rebuild the code every time a change is applied.

Application Architecture

Figure 6:
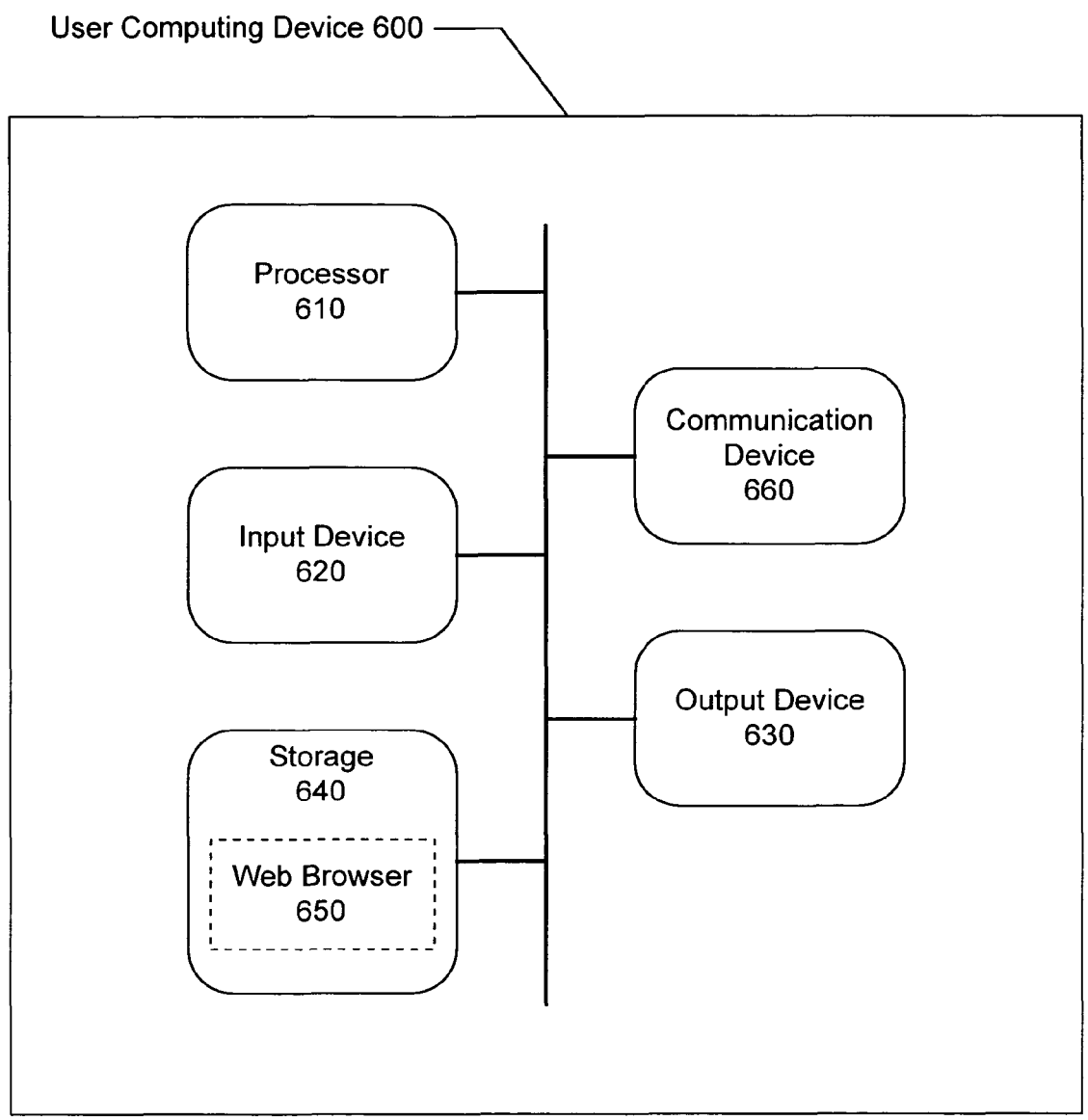
FIG. 6 is a block diagram that depicts a user computing device in accordance with an embodiment of the present invention.

FIG. 6 is a block diagram depicting the internal structure of user computing device 600 in accordance with an embodiment of the present invention. User computing device 600 may be a personal computer, handheld personal digital assistant ("PDA"), or any other type of microprocessor-based device. User computing device 600 may include one or more of processor 610, input device 620, output device 630, storage 640, and communication device 660.

Input device 620 may include a keyboard, mouse, pen-operated touch screen, voice-recognition device, or any other device that provides input. Output device 630 may include a monitor, printer, disk drive, speakers, or any other device that provides output.

Storage 640 may include volatile and nonvolatile data storage, including one or more electrical, magnetic or optical memories such as a RAM, cache, hard drive, CD-ROM drive, tape drive or removable storage disk. Communication device 660 may include a modem, network interface card, or any other device capable of transmitting and receiving signals over a network.

Web browser 650, which may be stored in storage 640 and executed by processor 610, may include Internet Explorer by Microsoft Corp. or Communicator® by Netscape Communications Corp., or any other software program that displays data from a web server via output device 630.

The components of user computing device 600 may be connected via an electrical bus or wirelessly.

Figure 7:
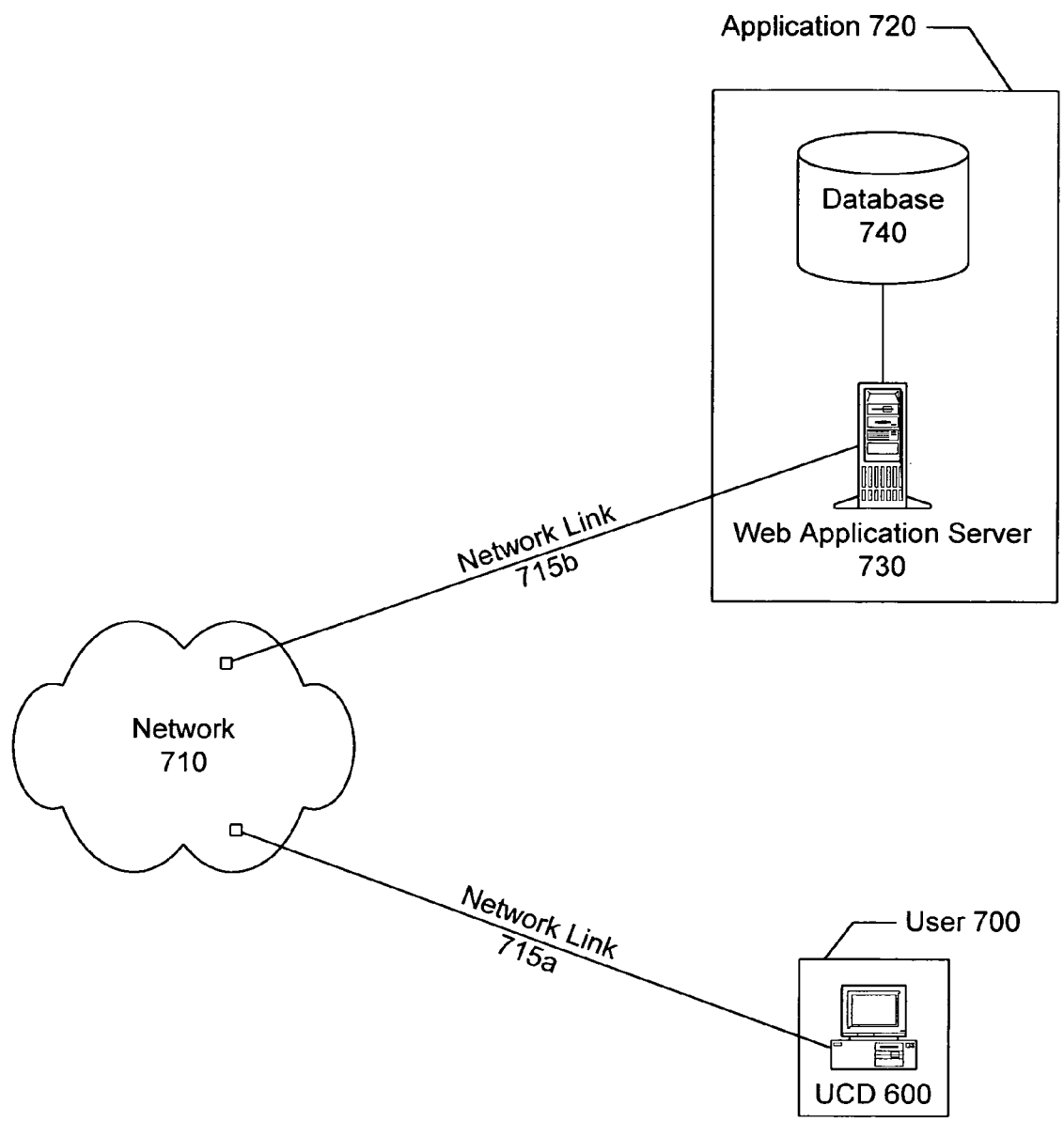
FIG. 7 is a block diagram that depicts an application architecture for an application in accordance with an embodiment of the present invention.

FIG. 7 is a block diagram depicting an application architecture for an application in accordance with an embodiment of the present invention. According to one particular embodiment, when user 700 employs web-based application services of application 720 (e.g., authoring tool 200 or publishing tool 240), user computing device 600 sends and receives via web browser 650 HTTP ("Hypertext Transport Protocol") requests (or any similar protocol requests) to and from web application server 730 via network link 715a, network 710, and network link 715b.

Network link 715 may include telephone lines, DSL, cable networks, T1 or T3 lines, wireless network connections, or any other arrangement that provides a medium for the transmission and reception of network signals. Network 710 may include any type of interconnected communication system, which may be based on packets, cells or circuits, for example.

Network 710 may implement any number of communications protocols, including TCP/IP (Transmission Control Protocol/Internet Protocol). The communication between UCD 600 and web application server 730 may be secured by any security protocol, such as SSL (Secured Sockets Layer).

Web application server 730 includes a processor and memory for executing program instructions, as well as a network interface, and may include a collection of servers working in tandem to distribute the network functionality and load. In one particular embodiment, web application server 730 may include a combination of servers such as a web application server, a web user interface server and a database server, all of which could be manufactured by Sun Microsystems, Inc. Web application server 730 could run an HTTP server program in one embodiment, such as Apache®, as a process under an operating system such as UNIX® (or any variant thereof). Database 740 may be part of a relational database program, such as MySQL® that may be run as a process by a database server within the UNIX® operating system, for example.

Application software residing in web application server 730 may take the form of custom-written programs and libraries that run, either interpreted or compiled, in part as a result of HTTP requests received by web application server 730. These programs may be written in any programming language, such as C, C++ or Java, and they may generate an HTML user interface of application 720. The application software may be built on a web-based enterprise application platform, such as J2EE® (Java 2 Platform, Enterprise Edition).

Several embodiments of the invention are specifically illustrated and/or described herein. However, it will be appreciated that modifications and variations of the invention are covered by the above teachings and within the purview of the appended claims without departing from the spirit and intended scope of the invention.

What is claimed is:

1. A computer-implemented method for managing ad campaign data, comprising:
   receiving, by at least one processor, a request to store data associated with an ad campaign;
   obtaining, by at least one processor, context information based on information received in the request, the context information including information regarding an ad type;
   validating, by at least one processor and based on the information regarding the ad type, the context information when the context information is sufficient to define a valid ad campaign of a type associated with the ad type; and
   responsive to the request, storing, by at least one processor, one or more output files and the validated context information associated with the data in a package file, with the validated context information being assembled according to a pre-defined data format defining a role of the data within the ad campaign.

2. The method of claim 1, wherein the request is received through a graphical user interface of an authoring tool.

3. The method of claim 2, wherein the data associated with the ad campaign corresponds to a creative.

4. The method of claim 3, wherein the authoring tool is a software application for generating the creative.

5. The method of claim 4, wherein the one or more output files include an asset file associated with the creative generated by the authoring tool.

6. The method of claim 5, wherein the asset file is one of an audio file, video file and an image file.

7. The method of claim 5, wherein the asset file is a vector graphic animation file.

8. The method of claim 2, wherein the data associated with the ad campaign corresponds to a media plan.

9. The method of claim 2, wherein the authoring tool is a word processing application for generating the media plan.

10. The method of claim 9, wherein the one or more output files include a word processing file associated with the media plan generated by the authoring tool.

11. The method of claim 1, wherein the pre-defined data format is based on an extensible markup language schema.

12. The method of claim 11, wherein the context information is stored in an extensible markup language document.

13. The method of claim 1, wherein the context information is stored in one or more of the one or more output files.

14. The method of claim 1, wherein the context information is stored in an e-mail.

15. The method of claim 1, wherein the context information relates to the ad campaign associated with the data.

16. The method of claim 15, wherein the context information includes at least one of a campaign name, a campaign start time and a campaign end time.

17. The method of claim 1, wherein the context information relates to the data associated with the ad campaign.

18. The method of claim 17, wherein the context information includes at least one of output file name associated with a creative and type of creative.

19. The method of claim 17, wherein the context information includes at least one of an output file name associated with a media plan and media buy information.

20. The method of claim 1, further comprising determining whether additional context information is required based on validating the obtained context information, and obtaining supplemental context information if additional context information is necessary.

21. A machine-readable medium having stored thereon a plurality of executable instructions for managing ad campaign data, the plurality of executable instructions causing a processor to:
   receive a request to store data associated with an ad campaign;
   obtain context information based on information received in the request, the context information including information regarding an ad type;
   validate, based on the information regarding the ad type, the context information when the context information is sufficient to define a valid ad campaign of a type associated with the ad type; and
   responsive to the request, store one or more output files and the validated context information associated with the data in a package file, with the validated context information being assembled according to a pre-defined data format defining a role of the data within the ad campaign.

22. The machine-readable medium of claim 21, wherein the plurality of executable instructions further cause the processor to:
   determine whether additional context information is required based on validating the obtained context information; and
   obtain additional context information when additional context information is necessary.

23. A system for managing ad campaign data, comprising:
   means for receiving a request to store data associated with an ad campaign;
   means for obtaining context information based on information received in the request, the context information including information regarding an ad type;
   a processor operable to determine whether the obtained context information is sufficient to define a valid ad campaign of a type associated with the ad type based on analysis of obtained context information;
   means for obtaining additional context information when the obtained context information is not sufficient to define a valid ad campaign of the type associated with the ad type; and
   means for storing, in response to the request and when the obtained context information is valid, one or more output files and the obtained context information associated with the data in a package file, with the obtained context information being assembled according to a pre-defined data format defining a role of the data within the ad campaign.

* * * * *

UNITED STATES PATENT AND TRADEMARK OFFICE
CERTIFICATE OF CORRECTION

| | | |
|---|---|---|
| PATENT NO. | : 8,082,178 B2 | Page 1 of 1 |
| APPLICATION NO. | : 10/891517 | |
| DATED | : December 20, 2011 | |
| INVENTOR(S) | : Wolkoff et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1103 days.

Signed and Sealed this

Second Day of October, 2012

David J. Kappos
*Director of the United States Patent and Trademark Office*